J. M. Robnett.
Bee Hive.
No. 90,873. Patented June 1, 1869.
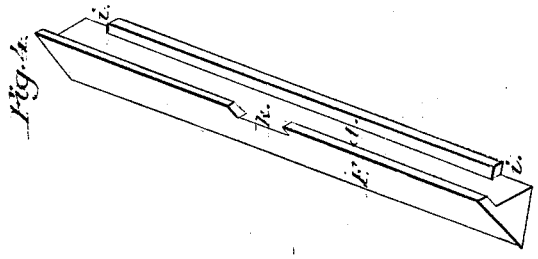
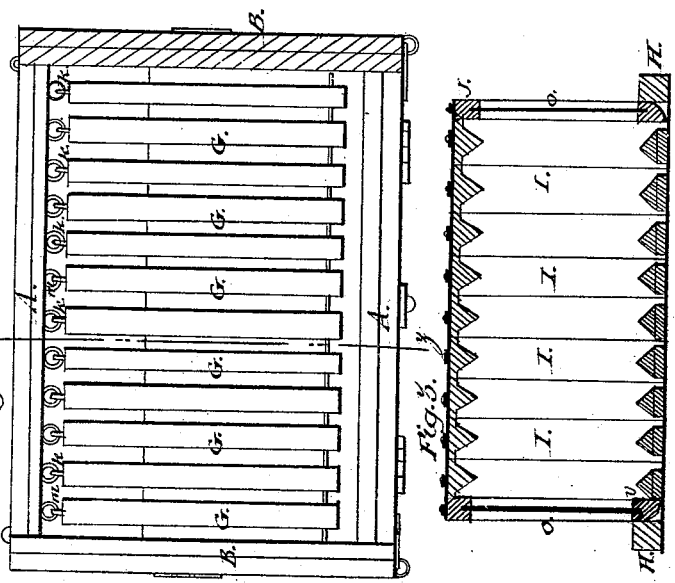
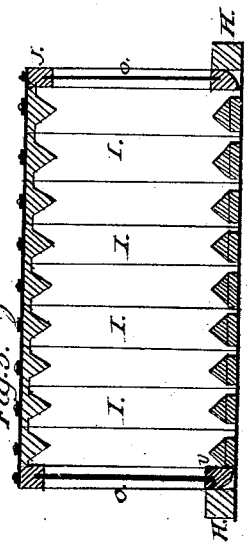
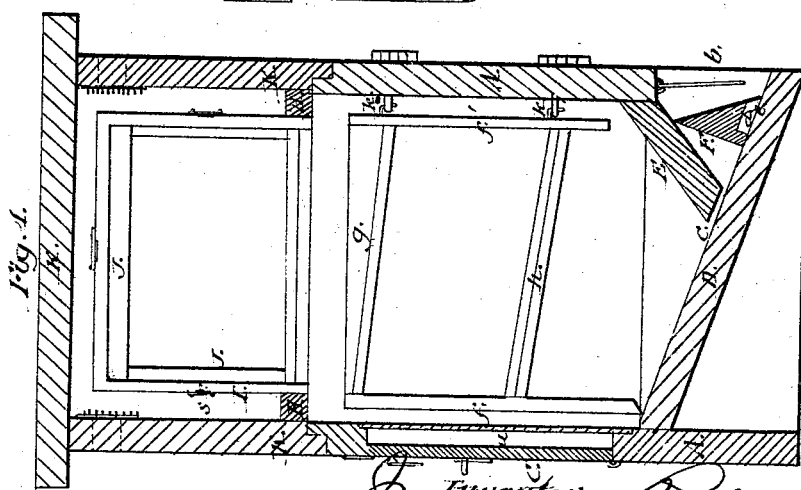

United States Patent Office.

JAMES M. ROBNETT, OF CENTRALIA, ILLINOIS.

Letters Patent No. 90,873, dated June 1, 1869.

---

IMPROVEMENT IN BEE-HIVES.

---

The Schedule referred to in these Letters Patent and making part of the same.

---

*To all whom it may concern:*

Be it known that I, JAMES M. ROBNETT, of Centralia, in the county of Marion, and in the State of Illinois, have invented certain new and useful Improvements in Bee-Hives; and do hereby declare that the following is a full, clear, and exact description thereof, reference being had to the accompanying drawings, and to the letters of reference marked thereon.

The nature of my invention consists in the construction and general arrangement of a "bee-hive," which will be hereinafter fully set forth.

In order to enable others skilled in the art to which my invention appertains, to make and use the same, I will now proceed to describe its construction and operation, referring to the annexed drawings, which form a part of this specification, and in which—

Figure 1 is a transverse vertical section;

Figure 2 is a plan view, with the top and honey-boxes removed; and

Figure 3 is a longitudinal vertical section of the honey-boxes.

Figure 4 is a perspective of the bee-entrance.

A represents a box, of suitable dimensions, forming the main hive.

This box is provided with a hinged door, B, at each end, and another hinged door, C, at the front side, inside of which latter door is a glass plate, $a$.

The bottom D, of the main hive A, is inclined from front to rear, as seen in fig. 1; and the rear side of the hive has an opening, $b$, extending above the rear lower end of the bottom the whole length of the hive.

Above this opening $b$, inside of the hive, is an inclined board, E, which points downward and rearward, and extends to near the inclined bottom D, leaving, however, between the two a passage, $c$, through which the bees enter the main hive.

It will be observed that the lower rear part of the bottom D, the board E, and the sides of the main hive A, form an entrance-chamber, through which the bees must pass before they reach the main hive.

In this chamber is placed a triangular bar, F, extending the whole length of said chamber.

This triangular bar is channelled on the lower side, as shown in fig. 4, said channel being marked $d$.

In the centre of the front side of said bar is an entrance, $e$, which leads into the channel $d$; and at each end, on the rear side of said bar, are openings, $i$ $i$, which lead from the channel $d$ into the chamber already mentioned.

It will readily be understood, that by this arrangement of the entrance to the chamber outside of the entrance to the main hive, the bees will have more and better opportunity to defend themselves against the miller, &c.

Inside of the main hive A, are pivoted or hinged a series of comb-guides, G G, each of which consists of two vertical bars, $f\ f'$, forming the ends of a frame, said bars being, at their upper ends, connected by a cross-bar, $g$.

This cross-bar is in the shape of a triangle, being horizontal or level at top, but its under side inclined or slanting from the bar $f$ to the bar $f'$, this edge of the cross-bar $g$ being also bevelled on both sides, so as to be V-shaped, thus making an inclined guide for the bees to build their combs on.

The combs built on an inclined guide are not so liable to be broken as those built on a straight or horizontal guide.

A suitable distance below the cross-bar $g$, between the vertical bars $f\ f'$, is placed a square bar, $h$, running parallel with the under side of the cross-bar $g$, and so placed that the edge or corner is upward, instead of one side.

The bar $f'$ is, on its outer side, provided with two hooks, $k\ k$, which are placed in eyes, $m\ m$, secured to the rear side of the main hive A. The other vertical bar $f$, being longer than the bar $f'$, rests on the bottom D.

The comb-guides or frames G G are thus hinged or pivoted to the rear side of the hive, so that they can easily be turned to either side when the end doors B B are opened.

I also provide the bars $f\ f'$ with pins $n\ n$, projecting on both sides, for the purpose of keeping the frames at a suitable distance from each other.

Above the frames G G is placed a frame, H, which I have represented in fig. 1 as being a short distance raised from them, but it may be laid on top of the frames G G, which position I also deem the best.

In this frame is placed a series of frames, I I, or honey-boxes, the bottoms of which are narrower than the sides and tops, so as to leave room between each frame, at the bottom, for the bees to enter.

At the ends of the honey-frames I I is placed another frame, J, with glass $o$, so as to give light to the same.

These latter frames are secured inside of the ends of the frame H, by pins or other suitable devices.

The honey-frames I I, and glass-frames J J, are held together on the sides and top by strips, $r$, placed in grooves on said frames, and held by bands or loops $s\ s$.

A cap, K, is placed over the honey-boxes, which cap fits on the upper edges of the main hive A, and is provided with suitable openings for ventilation.

Having thus fully described my invention,
What I claim as new, and desire to secure by Letters Patent, is—

1. The arrangement of the inclined bottom D, inclined board E, and triangular bar F, forming a chamber outside of the entrance to the main hive, substantially as shown and described.

2. The frame G, constructed as described, with inclined bevelled guide g, and inclined bar h, substantially as shown and described.

3. In combination with the main hive A and frames G G, the frame H, containing the honey-boxes I I, and glass-frames J J, substantially as shown and described.

In testimony that I claim the foregoing, I have hereunto set my hand, this 4th day of March, 1869.

JAMES M. ROBNETT.

Witnesses:
S. L. HAND,
G. M. PHELPS.